United States Patent
Timm

(10) Patent No.: US 10,092,839 B2
(45) Date of Patent: Oct. 9, 2018

(54) MULTI-PLAYER VIDEO GAME ENVIRONMENT FOR SINGLE-PLAYER USE

(71) Applicant: SONY INTERACTIVE ENTERTAINMENT AMERICA LLC, San Mateo, CA (US)

(72) Inventor: Paul Timm, San Diego, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 116 days.

(21) Appl. No.: 15/277,809

(22) Filed: Sep. 27, 2016

(65) Prior Publication Data

US 2017/0028301 A1 Feb. 2, 2017

Related U.S. Application Data

(63) Continuation of application No. 14/058,072, filed on Oct. 18, 2013, now Pat. No. 9,452,363.

(51) Int. Cl.
    *A63F 13/00* (2014.01)
    *A63F 13/52* (2014.01)
    *A63F 13/67* (2014.01)
    *A63F 13/25* (2014.01)
    *A63F 13/55* (2014.01)

(52) U.S. Cl.
    CPC .............. *A63F 13/52* (2014.09); *A63F 13/25* (2014.09); *A63F 13/55* (2014.09); *A63F 13/67* (2014.09)

(58) Field of Classification Search
    CPC ....................................................... A63F 13/06
    See application file for complete search history.

(56) References Cited

U.S. PATENT DOCUMENTS

| 7,296,007 B1 | 11/2007 | Funge et al. |
| 8,342,963 B2 | 1/2013 | Steiner et al. |
| 9,108,108 B2 | 8/2015 | Zaleeski et al. |
| 9,452,363 B2 | 9/2016 | Timm |
| 2003/0109305 A1 | 6/2003 | Gavin et al. |
| 2004/0266506 A1 | 12/2004 | Herbrich et al. |
| 2007/0054717 A1 | 3/2007 | Youm et al. |
| 2008/0207330 A1 | 8/2008 | Beale |
| 2012/0021823 A1 | 1/2012 | Youm |
| 2015/0111641 A1 | 4/2015 | Timm |

FOREIGN PATENT DOCUMENTS

WO  WO 2015/057362  4/2015

OTHER PUBLICATIONS

PCT Application No. PCT/US2014/057064 International Search Report and Written Opinion dated Dec. 24, 2014.
U.S. Appl. No. 14/058,072 Office Action dated Sep. 11, 2015.

*Primary Examiner* — Reginald Renwick
(74) *Attorney, Agent, or Firm* — Polsinelli LLP

(57) ABSTRACT

A multi-player game environment is created for single-player use. A user may select a single-player game or a multi-player game. When the user chooses a multi-player game, the user is prompted to select one or more customized AI characters. The AI characters may be available individually or in themed "packs." The selected AI character or pack may be downloaded, stored, or otherwise made accessible to an electronic entertainment system. The user may select a mode or skill level for each AI character. The user may begin playing the game in a multi-player mode with the game environment populated with an avatar effectuating behaviors of the selected AI character or characters.

19 Claims, 8 Drawing Sheets

MULTI-PLAYER VIDEO GAME ENVIRONMENT FOR SINGLE-PLAYER USE

CROSS-REFERENCE TO RELATED APPLICATIONS

The present application claims the priority benefit of U.S. patent application Ser. No. 14/058,072 filed Oct. 18, 2013, now U.S. Pat. No. 9,452,363, the disclosure of which is incorporated herein by reference.

BACKGROUND OF THE INVENTION

Field of the Invention

This invention generally relates to electronic entertainment systems and more particularly to creating multi-player-like experiences in video game environments for single-player use.

Description of the Related Art

In electronic entertainment and video game systems, a user typically controls the behavior or actions of at least one character in a game environment. A game program executed to generate that environment is generally either for a single-player game or a multi-player game. Alternatively a single game program may have modes for both single-player game environments and multi-player game environments.

In single-player games, a user is generally the only intelligent player in a single game environment. The user may interact with elements in the game program, such as non-player characters whose actions are controlled by a set of rules.

In multi-player games, two or more users control the behavior or actions of a different character in a game program. In such a game, all users share the same game environment or portions of a larger game environment (e.g, different portions of a battlefield, building, tunnel system, and so forth). The users may be playing together cooperatively as partners or as a part of a team. The users may alternatively play against one another competitively.

In some multi-player games, the users may all be human, or one may be a human and the others are computer-controlled. In other instances, there may be some other combination of human and computer players. The users may share one game system or may play on separate game systems connected by a communications network. The game system may also be part of a cloud-based game environment with multiple client controls and applications that may allow for interaction with the same.

Single-player games and multi-player games each have advantages. Single-player games allow a user to control the game environment without distraction or interference from other users. For this reason, some users may only purchase games that include a single player mode. On the other hand, multi-player games may allow users to learn different game play styles from watching other uses, interact with other users, and cooperate with other uses to help one another advance or win the game.

Some solutions exist to incorporate the benefits of multi-player games in a single-player game mode. For example, tutorials are included in many game programs that allow a user to see a "walkthrough" of a game whereby the user is provided a step-by-step guide to playing the game. This may allow users to solve difficult problems or navigate advanced levels of the game. These tutorials effectively allow users to cheat by teaching them how to win the game without requiring them to make any substantive decisions or undertake any long term exploration of the game environment during game play. Some users may wish to receive guidance without being given explicit instructions on how to win the game, as it may be more stimulating and satisfying when a user is able to play and win the game on his own.

Similarly, the computer-controlled characters that may be available in some game programs may allow users to learn from the behavior and actions of another character, but the computer-controlled characters lack intelligence. Thus, they are unable to adapt during game play and make decisions about when and how to assist or interact with the human user throughout the game.

There is a need for a multi-player game environment that allows a single player to utilize artificial intelligence (AI) characters based on real human players that provide guidance during cooperative game play and competition during adversarial game play.

SUMMARY OF THE CLAIMED INVENTION

Embodiments of the present invention provide for creating a multi-player video game environment that can be played by a single user. The single user may choose to play a multi-player game by choosing a customized AI character that is based on another player. The AI characters may individual characters or multiple characters in themed "packs" that the user may buy or download. Once the AI character is downloaded, the user may begin playing the game in a multi-player mode along with the AI character.

Further embodiments include software executed on a computer that creates a multi-player video game environment that can be played by a single-player user. The single user may choose to play a multi-player game by choosing a customized AI character that is based on another player. Once the AI character is downloaded, the user may begin playing the game in a multi-player mode along with the AI character.

Some embodiments of the present invention further include a video game system that creates a multi-player video game environment that can be played by a single-player user. The system allows a single user to choose an option to play a multi-player game by selecting a customized AI character that is based on another player. Once the system receives the AI character selection, it displays the game environment so that the user may begin playing the game in a multi-player mode along with the AI character.

DETAILED DESCRIPTION

Figure 1:
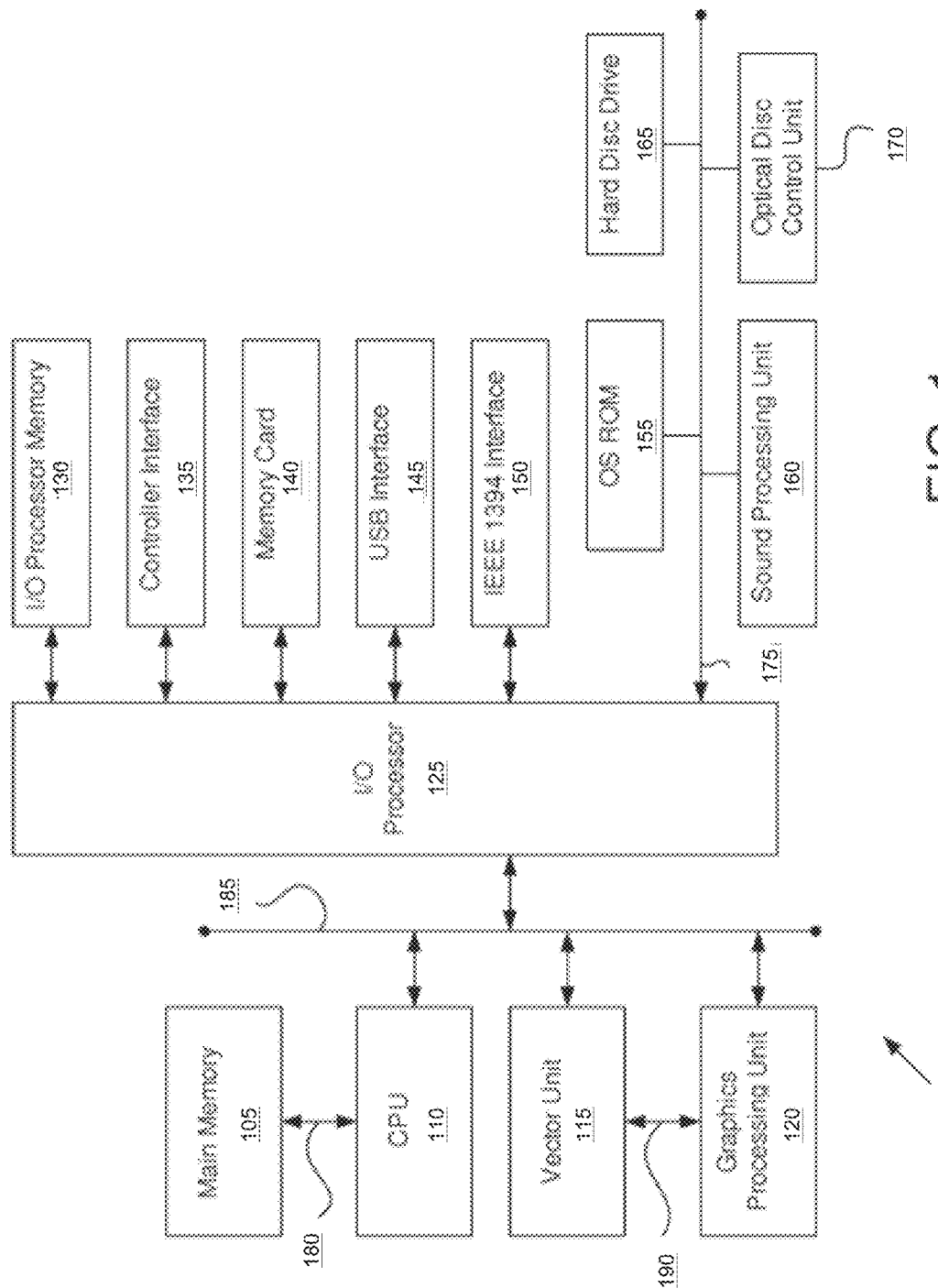
FIG. 1 is a block diagram of an exemplary electronic entertainment system.

FIG. 1 is a block diagram of an exemplary electronic entertainment system 100. The entertainment system 100 of FIG. 1 includes a main memory 105, a central processing unit (CPU) 110, vector unit 115, a graphics processing unit 120, an input/output (I/O) processor 125, an I/O processor memory 130, a controller interface 135, a memory card 140, a Universal Serial Bus (USB) interface 145, and an IEEE 1394 interface 150. The entertainment system 100 further includes an operating system read-only memory (OS ROM) 155, a sound processing unit 160, an optical disc control unit 170, and a hard disc drive 165, which are connected via a bus 175 to the I/O processor 125.

Entertainment system 100 may be an electronic game console. Alternatively, the entertainment system 100 may be implemented as a general-purpose computer, a set-top box, a hand-held game device, a tablet computing device, or a mobile computing device or phone. Entertainment systems may contain more or less operating components depending on a particular form factor, purpose, or design.

The CPU 110, the vector unit 115, the graphics processing unit 120, and the I/O processor 125 of FIG. 1 communicate via a system bus 185. Further, the CPU 110 of FIG. 1 communicates with the main memory 105 via a dedicated bus 180, while the vector unit 115 and the graphics processing unit 120 may communicate through a dedicated bus 190. The CPU 110 of FIG. 1 executes programs stored in the OS ROM 155 and the main memory 105. The main memory 105 of FIG. 1 may contain pre-stored programs and programs transferred through the I/O Processor 125 from a CD-ROM, DVD-ROM, or other optical disc (not shown) using the optical disc control unit 170. I/O Processor 125 of FIG. 1 may also allow for the introduction of content transferred over a wireless or other communications network (e.g., 4$, LTE, 3G, and so forth). The I/O processor 125 of FIG. 1 primarily controls data exchanges between the various devices of the entertainment system 100 including the CPU 110, the vector unit 115, the graphics processing unit 120, and the controller interface 135.

The graphics processing unit 120 of FIG. 1 executes graphics instructions received from the CPU 110 and the vector unit 115 to produce images for display on a display device (not shown). For example, the vector unit 115 of FIG. 1 may transform objects from three-dimensional coordinates to two-dimensional coordinates, and send the two-dimensional coordinates to the graphics processing unit 120. Furthermore, the sound processing unit 160 executes instructions to produce sound signals that are outputted to an audio device such as speakers (not shown). Other devices may be connected to the entertainment system 100 via the USB interface 145, and the IEEE 1394 interface 150 such as wireless transceivers, which may also be embedded in the system 100 or as a part of some other component such as a processor.

A user of the entertainment system 100 of FIG. 1 provides instructions via the controller interface 135 to the CPU 110. For example, the user may instruct the CPU 110 to store certain game information on the memory card 140 or other non-transitory computer-readable storage media or instruct a character in a game to perform some specified action.

Figure 2:
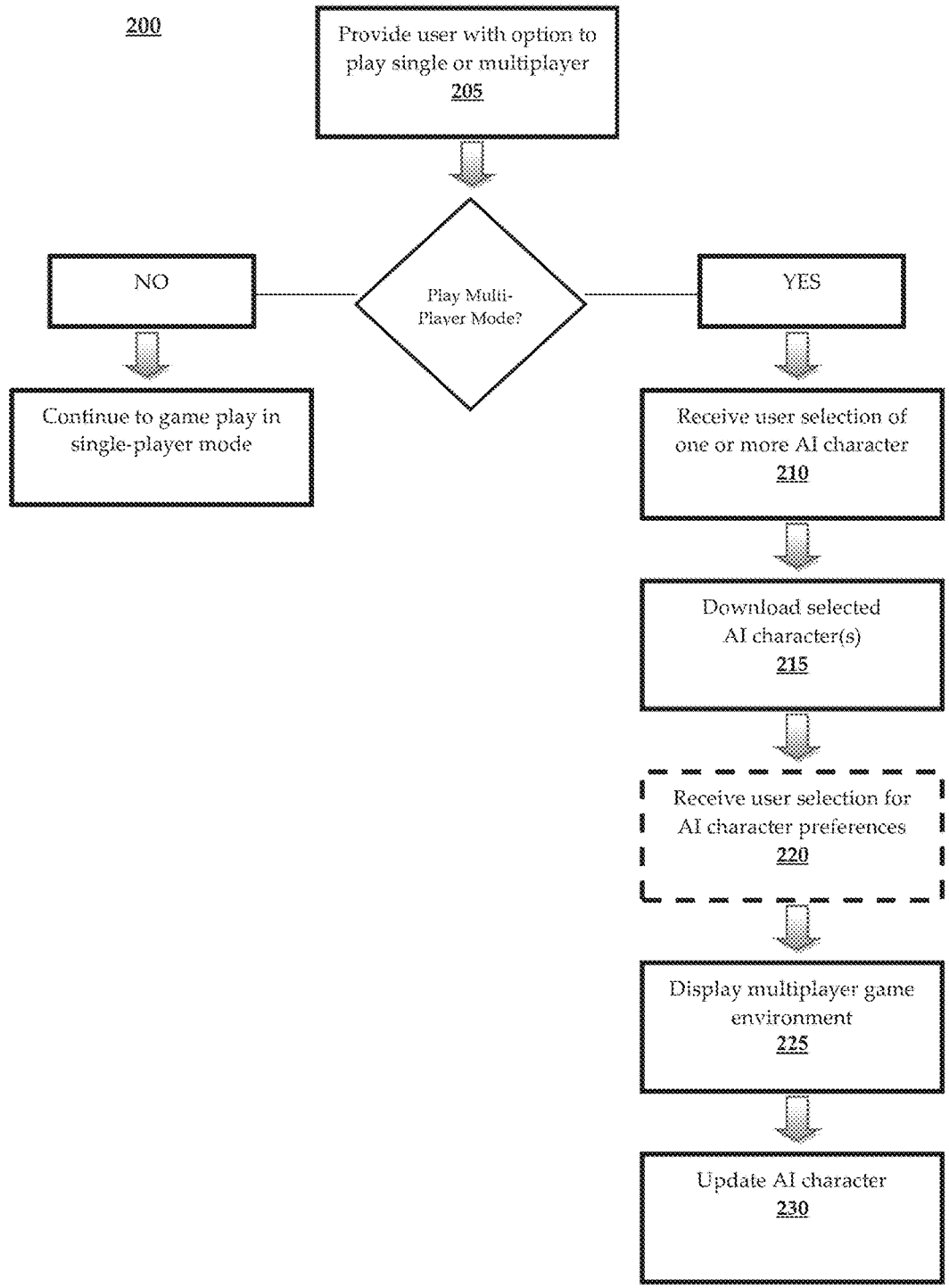
FIG. 2 is a flowchart of method steps for creating a multi-player game environment for single-player use.

FIG. 2 is a flowchart of method steps for creating a multi-player game environment for single-player use. In step 205 of FIG. 2, the CPU 110 of FIG. 1 executes a software module stored in main memory 105 of FIG. 1 with instructions to provide a user with an option to play a single-player game or a multi-player game. If the user chooses to play a single-player game, the game begins using an unaltered, single-player environment.

When the user chooses to play a multi-player game, the user is prompted to select one or more AI characters at step 210 of FIG. 2. An AI character may be created based on a human player by using data about the human player, e.g., actions, behavior, and game play style, are recorded used to create an AI character that has the same characteristics.

The prompt may allow the user to choose an AI character based on a player that the user knows, or an AI character based on a player that the user does not know. In the latter instance, the character may be that of a celebrity or other person of repute in the video game community or for a particular video game. In some instances, game players may make their prior game play behavior available for purchase as an AI character. The AI characters based on players that the user knows may appear in a "friends" list that shows AI characters available for players that have previously used the entertainment system or that the user is connected to through a network.

The AI characters may be available in themed "packs" that are offered through the entertainment system. For example, one pack may have different AI characters that have a certain style, such as a "stealth" style or a "fighter" style. The pack may also include AI characters of different skill levels. Alternatively, a single AI character may have different styles and skill levels from which a user may choose. Other AI characters that may be available include players that appear, for example, on leader boards for the game. A user may wish to use such AI characters in order to compete against or learn from highly skilled players of a particular game. Single AI characters or packs may be available for free or the user may be charged a fee for the download.

The user may send instructions to CPU 110 (FIG. 1) to download the selected AI character(s) at step 215 of FIG. 2. The AI character may downloaded permanently or temporarily into memory. The character, too, may be accessed as part of a cloud computing game environment.

Optionally, at step 220 of FIG. 2, the user may select a mode for each AI character based on the level of involvement the user wishes the AI character to have within the game environment. For example, the user may select an "active" mode, in which the AI character may behave as fully engaged player similar to another human player in a multi-player game. A "passive" mode may be used when the user wishes for the AI character to act as a secondary character that may assist the user when called upon. Alternatively, a "tutorial" mode may be used where the user does not want the AI character to play the game alongside the user, but instead may be turned "on" and "off" when the user needs assistance. In this way, the AI character could serve as an alternative or a replacement for conventional tutorial books that are commonly used to help players navigate games.

At step 225 of FIG. 2, the multi-player game environment is displayed to the user and the user may begin playing the game in a multi-player mode. The game environment may be populated with an avatar representing the game play behaviors of the selected AI character or characters.

Constraints may be placed on the avatars of the AI characters effectuating certain behaviors to ensure that the realism of the game is preserved for the user. The game program may recognize certain physical limitations present in the game environment that require the AI character to alter its behavior. The program may "flag" instances in which the AI character may need instructions. The flags may be stored in a table in memory, each flag being associated with a particular scene in the game environment. When the user reaches a new scene, the AI accesses the table and follows instructions based on the flags present in the table associated with that scene.

For example and by way of illustration, a door may be shut in the game environment that happened to be open when the actions of the player associated with the AI character were recorded. The game environment would be disrupted if the AI character were to walk through the closed door while the character controlled by the user is left behind. The AI character would be instructed to pause and wait for the user to open the door. Similarly, an object may be present in the game environment from which the AI was derived, that is not in the game environment being played by the user. For example, the AI character may be attempting to fight a monster that the user, in his game environment, has already defeated. Thus, the AI character would be instructed that the object is no longer present and to discontinue interacting with the object. In another example, the AI character may be moving faster or slower than the user during game play. The AI character, in such a situation, would be instructed to either slow down or speed up accordingly. In this way, the AI character does not interfere with game play and the realism of the game environment is maintained. Furthermore, the user is required to continue to make substantive decisions to progress through the game.

At step 230 of FIG. 2, the AI characters are updated periodically. For example, an AI character may be updated when new data has become available to improve the character.

FIGS. 3A-3F illustrate exemplary interfaces for creating a multi-player game environment for single-player use.

Figure 3A:
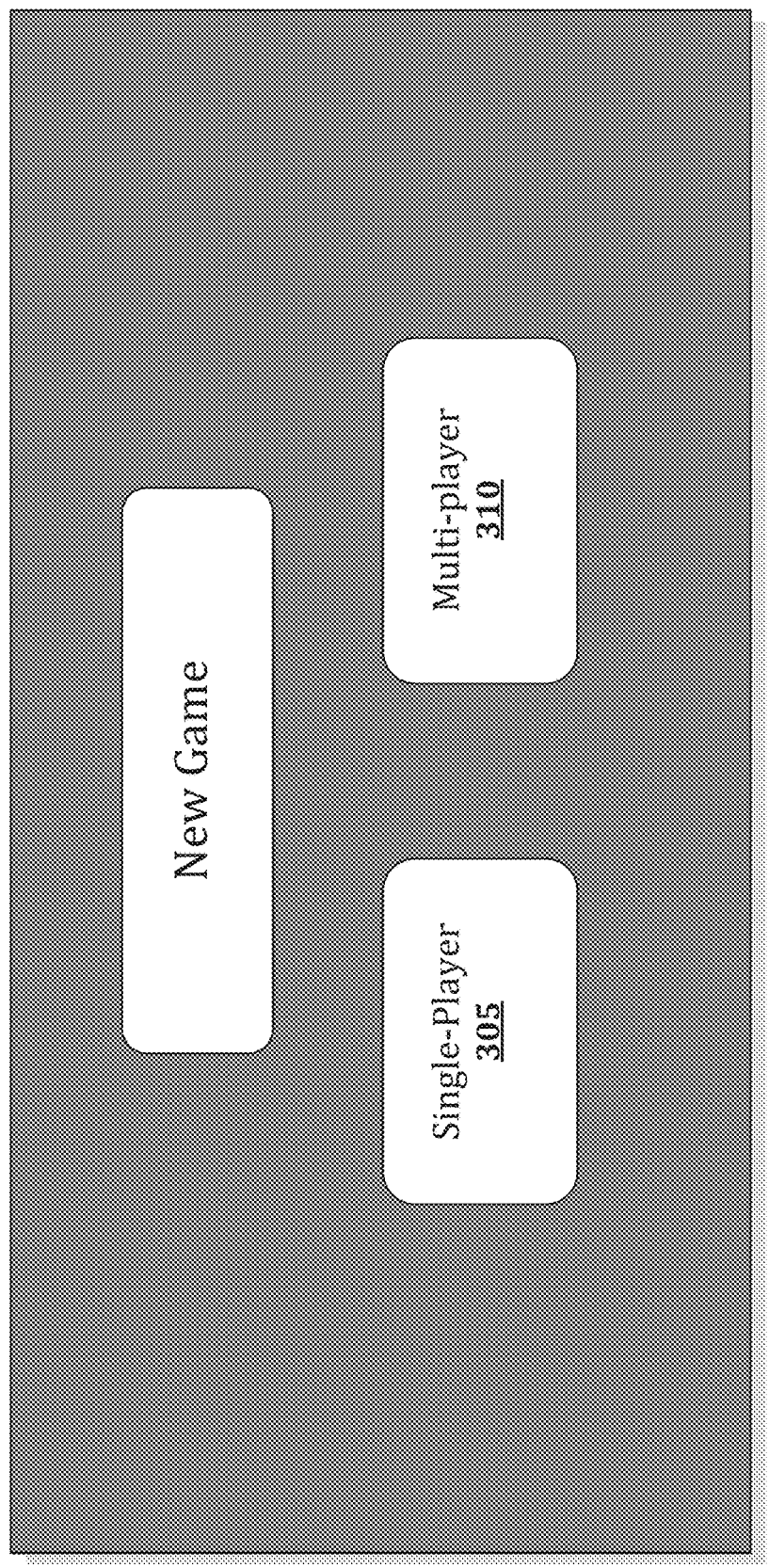
FIG. 3A illustrates a start menu in an exemplary entertainment system environment.

Referring now to FIG. 3A, which illustrates a start menu in an exemplary entertainment system environment. The user may select "Single-Player" mode 305 or "Multi-player" mode 310, as described in step 205 of FIG. 2.

Figure 3B:
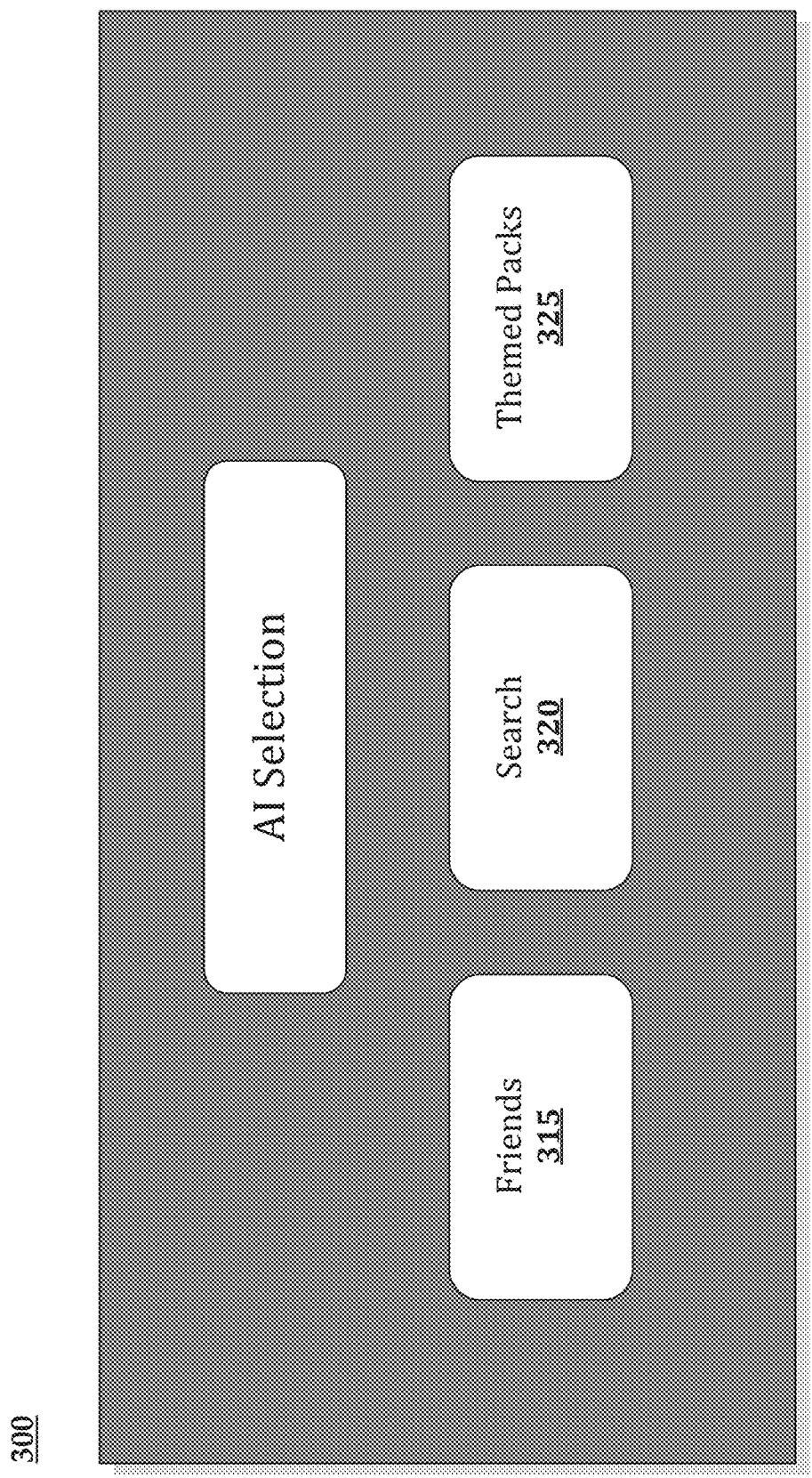
FIG. 3B illustrates an AI selection menu in an exemplary entertainment system environment.

Referring now to FIG. 3B, which illustrates an AI selection menu in an exemplary entertainment system environment. After the user selects "Multi-player" mode 310 (FIG. 3A), the user is prompted to select one or more AI characters, as described in step 210 of FIG. 2. The user may choose an AI character from a "Friends" list 315 of FIG. 3B. Alternatively, the user may search for an individual AI character by typing criteria into search box 320 of FIG. 3B. The user may also choose a pack of AI characters by selecting "Theme Pack" button 325 of FIG. 3B.

Figure 3C:
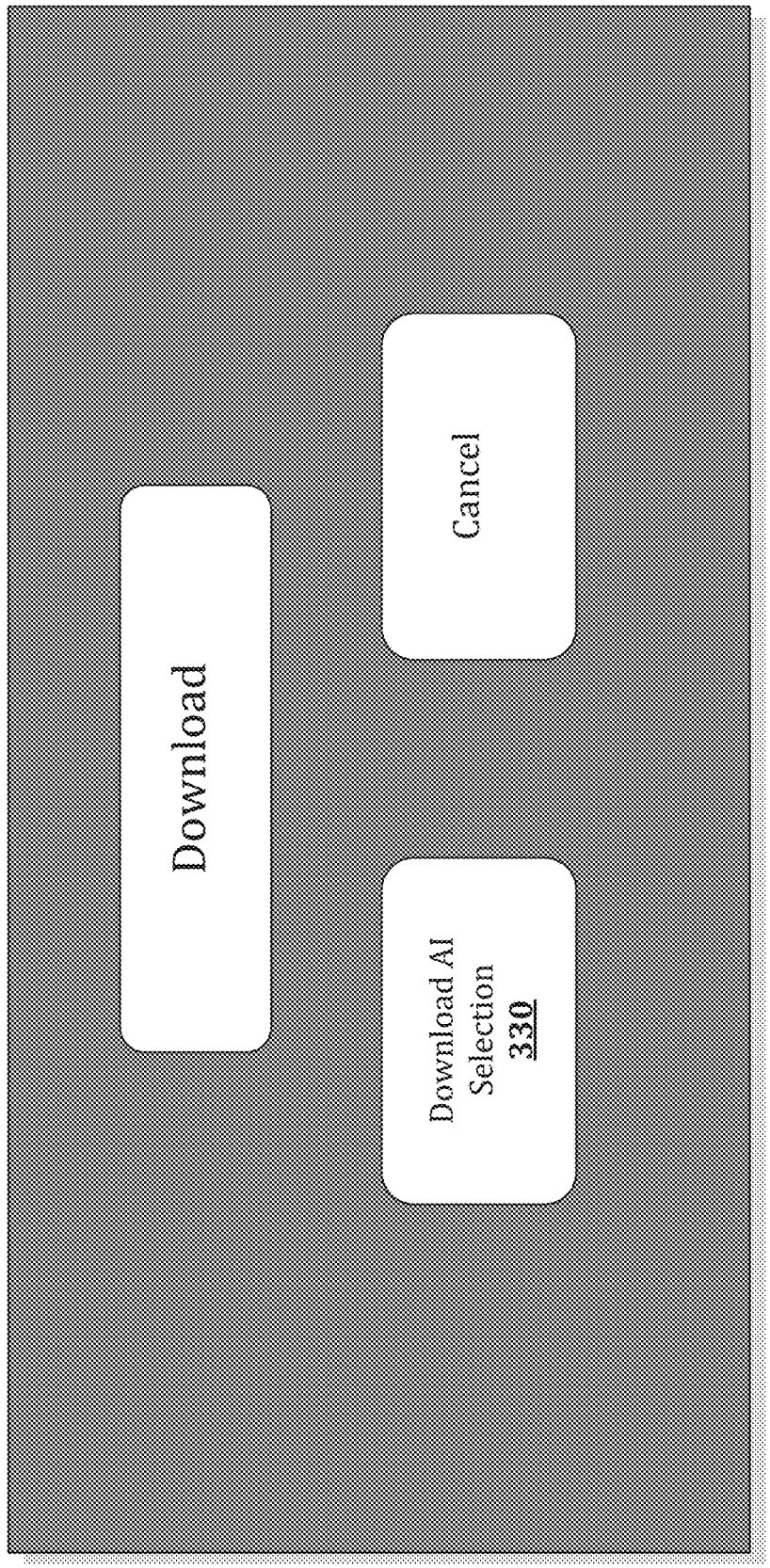
FIG. 3C illustrates a download menu in an exemplary entertainment system environment.

Referring now to FIG. 3C, which illustrates a download menu in an exemplary entertainment system environment. The user may download the selected AI character(s) by selecting "Download AI Selection" button 330, as described in step 215 of FIG. 2.

Figure 3D:
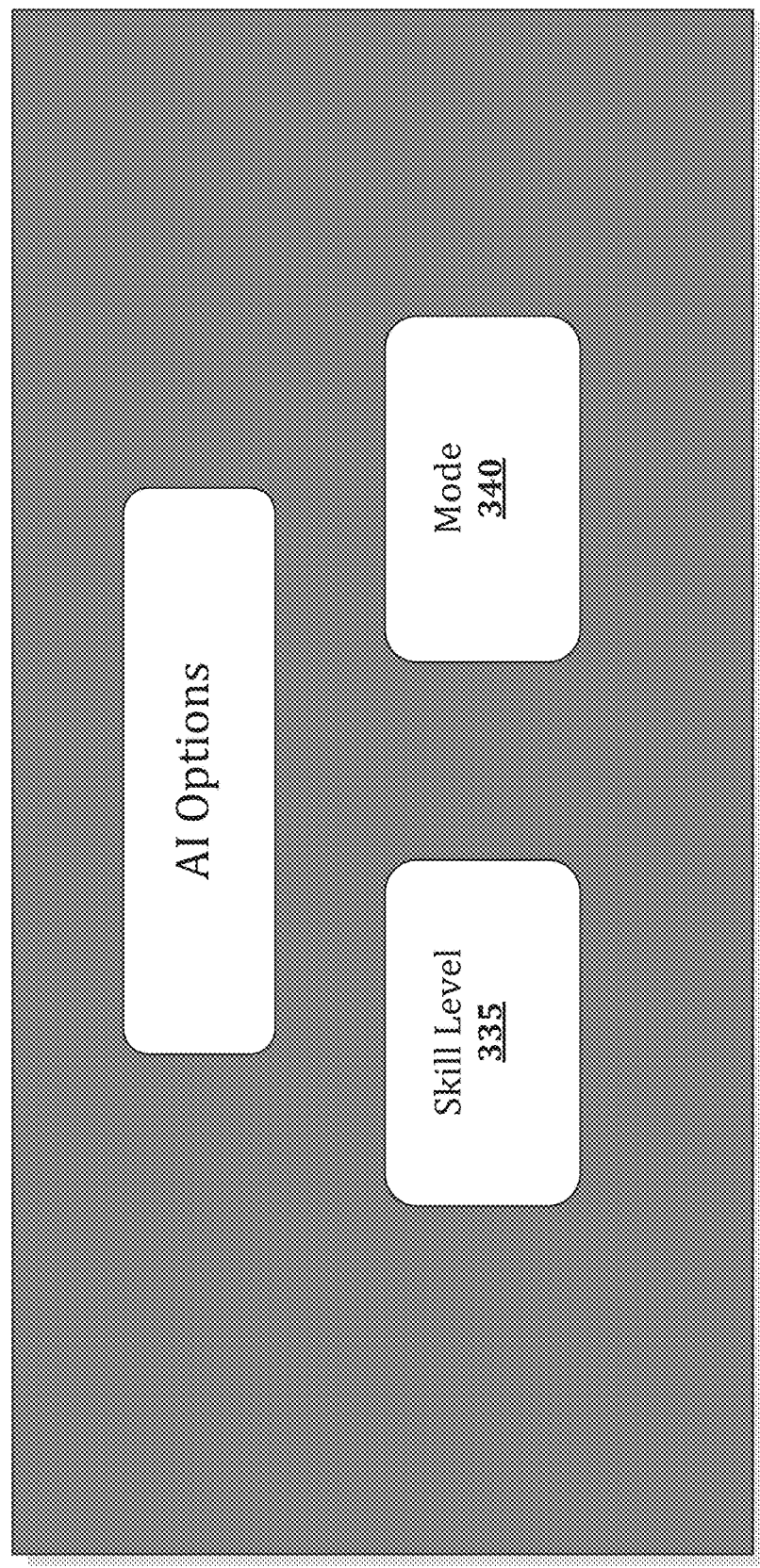
FIG. 3D illustrates an AI options menu in an exemplary entertainment system environment.

Referring now to FIG. 3D, which illustrates an AI options menu in an exemplary entertainment system environment. The user may customize a selected AI character. For example, the user may select a "Skill Level" button 335 or a "Mode" button 340 of FIG. 3D, as described in step 220 of FIG. 2.

Figure 3E:
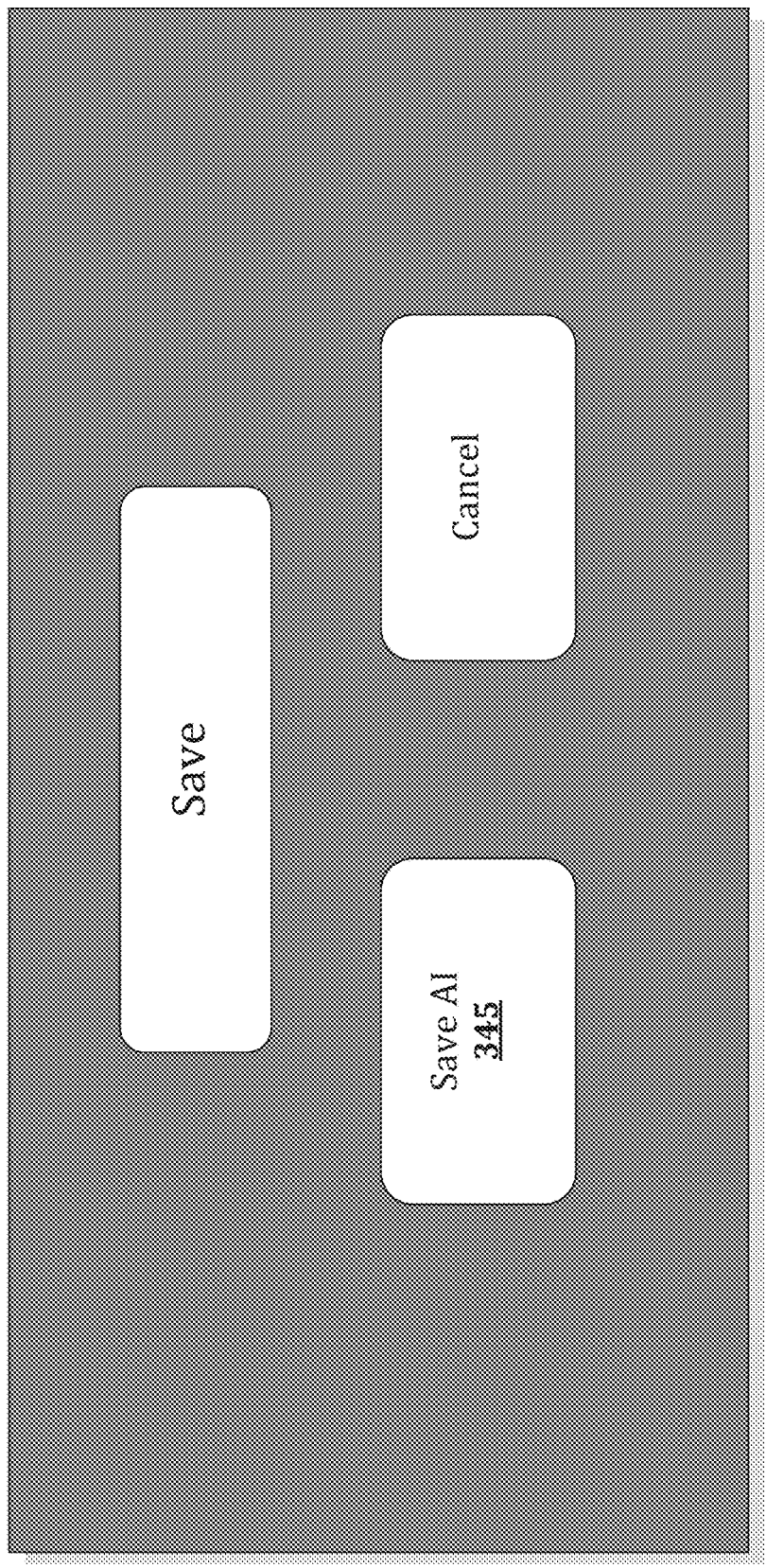
FIG. 3E illustrates a save menu in an exemplary entertainment system environment.

Referring now to FIG. 3E, which illustrates a save menu in an exemplary entertainment system environment. The user may store the downloaded AI character(s) on a memory card 140 of FIG. 1 by selecting the "Save AI" button 345 of FIG. 3E.

Figure 3F:
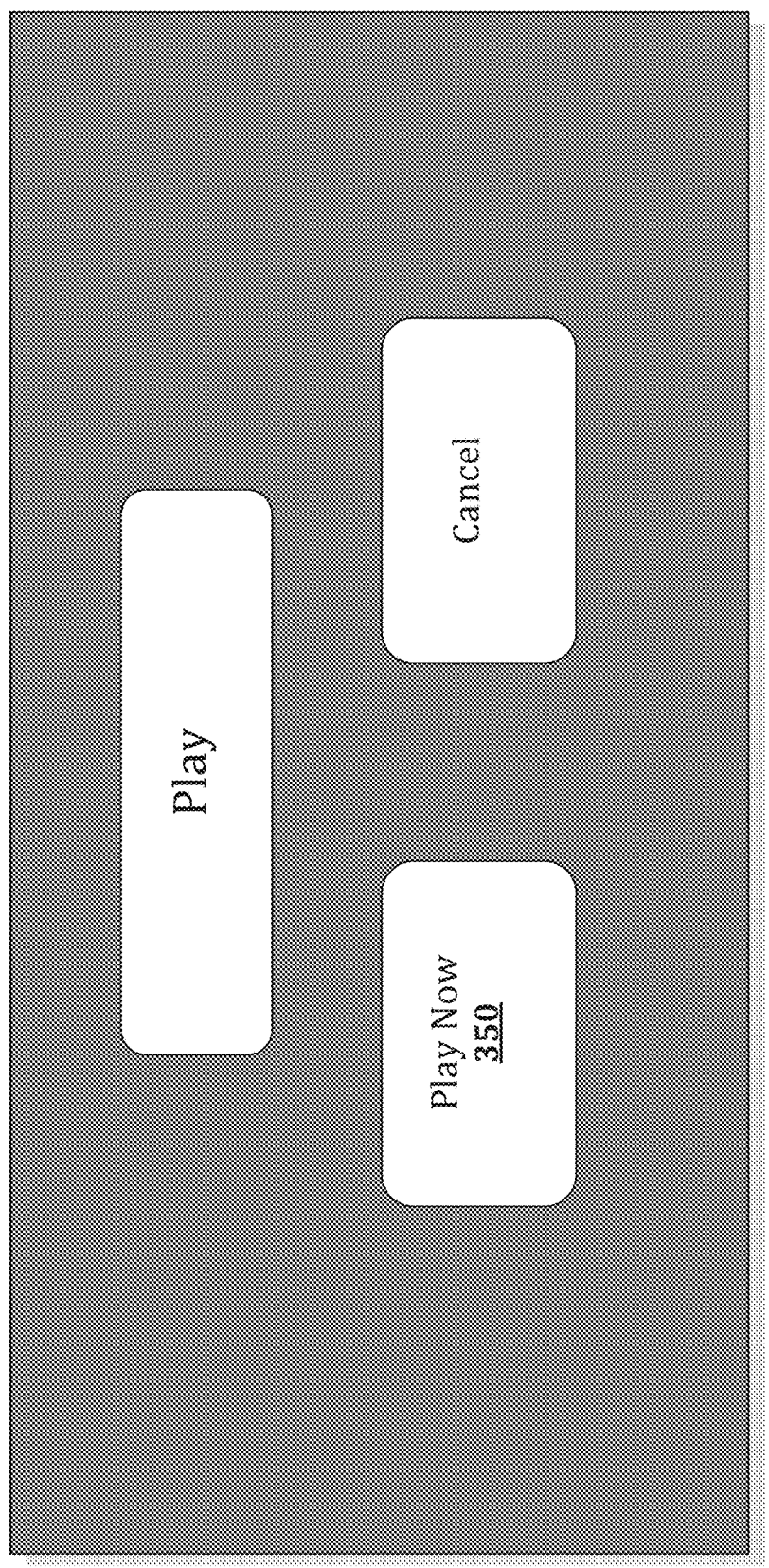
FIG. 3F illustrates a play menu in an exemplary entertainment system environment.

Referring now to FIG. 3F, which illustrates a play menu in an exemplary entertainment system environment. The user may choose the "Play Now" button 350 of FIG. 3F to display the multi-player game environment populated with the AI character(s) and commence game play, as described in step 225 of FIG. 2.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for creating a multi-player game environment for single-player use on an electronic entertainment system, the method comprising:
   storing information in memory regarding a game with one or more AI characters;
   receiving one or more user preferences for at least one of the AI characters from a first user, wherein the user preferences include a preference for an active mode or a passive mode; and
   executing non-transitory computer readable instructions stored in memory, wherein execution of the instructions by a processor:
      displays a game environment for game play by the first user, wherein the game environment is populated with an avatar of the at least one AI character, and
      effectuates one or more behaviors by the avatar within the game environment, wherein the effectuated behaviors are based on the received user preferences indicating a preferred mode of game play, the active mode entailing the at least one AI character acting in accordance with a game play behavior of a second user and the passive mode entailing the at least one AI character acting only upon request by the first user.

2. The method of claim 1, wherein the preferred mode of gameplay includes a tutorial mode having the at least one AI character.

3. The method of claim 1, wherein input from the first user is capable of changing the behavior of the at least one AI character as desired during gameplay.

4. The method of claim 1, wherein the preferred mode of gameplay is a multi-player mode having one or more of the AI characters.

5. The method of claim 1, wherein the effectuation of the behaviors by the avatar within the game environment is further constrained based on the game environment.

6. The method of claim 1, wherein the information associated with the at least one AI character of the game are updated periodically when new data is available to improve the at least one AI character.

7. The method of claim 1, wherein information for one or more of the AI characters is customizable by input from the first user.

8. The method of claim 1, wherein information for one or more of the AI characters is located and downloaded using a user search by the first user, the downloaded AI character information being usable by the first user within the game.

9. The method of claim 1, wherein the effectuation of the behaviors by the avatar within the game environment is modified based on current gameplay of the first user.

10. A non-transitory computer-readable storage medium having embodied thereon a program, the program being executable by a processor to perform a method for creating a multi-player game environment for single-player use on an electronic entertainment system, the method comprising:
    storing information in memory regarding a game with one or more AI characters;

receiving one or more user preferences for at least one of the AI characters from a first user, wherein the user preferences include a preference for an active mode or a passive mode; and executing non-transitory computer readable instructions stored in memory, wherein execution of the instructions by a processor:

displays a game environment for game play by the first user, wherein the game environment is populated with an avatar of the at least one AI character, and effectuates one or more behaviors by the avatar within the game environment, wherein the effectuated behaviors are based on the received user preferences indicating a preferred mode of game play, the active mode entailing the at least one AI character acting in accordance with a game play behavior of a second user and the passive mode entailing the at least one AI character acting only upon request by the first user.

11. The non-transitory computer-readable storage medium of claim 10, wherein the preferred mode of gameplay includes a tutorial mode having the at least one AI character.

12. The non-transitory computer-readable storage medium of claim 10, wherein input from the first user is capable of changing the behavior of the at least one AI character as desired during gameplay.

13. The non-transitory computer-readable storage medium of claim 10, wherein the preferred mode of gameplay is a multi-player mode having one or more of the AI characters.

14. The non-transitory computer-readable storage medium of claim 10, wherein the effectuation of the behaviors by the avatar within the game environment is further constrained based on the game environment.

15. The non-transitory computer-readable storage medium of claim 10, wherein the information associated with the at least one AI character of the game are updated periodically when new data is available to improve the at least one AI character.

16. The non-transitory computer-readable storage medium of claim 10, wherein information for one or more of the AI characters is customizable by input from the first user.

17. The non-transitory computer-readable storage medium of claim 10, wherein information for one or more of the AI characters is located and downloaded using a user search by the first user, the downloaded AI character information being usable by the first user within the game.

18. The non-transitory computer-readable storage medium of claim 10, wherein the effectuation of the behaviors by the avatar within the game environment is modified based on current gameplay of the first user.

19. A system for creating a multi-player game environment for single-player use on an electronic entertainment system, the system comprising:

a processor for executing instructions stored in memory, wherein execution of the instructions by the processor:

stores information in memory regarding a game with one or more AI characters, receives one or more user preferences for at least one of the AI characters from a first user, wherein the user preferences include a preference for an active mode or a passive mode, and effectuates one or more behaviors by the avatar within the game environment, wherein the effectuated behaviors are based on the received user preferences indicating a preferred mode of game play, the active mode entailing the at least one AI character acting in accordance with a game play behavior of a second user and the passive mode entailing the at least one AI character acting only upon request by the first user; and a display device that displays a game environment for game play by the first user, wherein the game environment is populated with an avatar of the at least one AI character.

* * * * *